United States Patent [19]

Kano et al.

[11] Patent Number: 5,589,150
[45] Date of Patent: Dec. 31, 1996

[54] METHOD FOR PREPARING SPHERULAR SILICA GEL PARTICLES

[75] Inventors: Jiro Kano, Hyuga, Japan; Ryuji Orii, Corvallis, Oreg.; Yuzo Horinouchi, Nobeoka; Mutsuhiro Ito, Hyuga, both of Japan

[73] Assignee: Fuji-Davison Chemical Ltd., Aichi-ken, Japan

[21] Appl. No.: 845,528

[22] Filed: Mar. 4, 1992

Related U.S. Application Data

[63] Continuation of Ser. No. 556,898, Jul. 23, 1990, abandoned.

[51] Int. Cl.$^6$ .................................................. C01B 33/12
[52] U.S. Cl. .................................................. 423/338; 423/339
[58] Field of Search ........................... 423/335, 338, 423/339; 424/49; 502/233

[56] References Cited

U.S. PATENT DOCUMENTS

| | | | |
|---|---|---|---|
| 3,501,269 | 3/1970 | Winyall et al. | 423/335 |
| 3,607,777 | 9/1971 | Winyall et al. | 423/333 |
| 3,959,174 | 5/1976 | Winyall et al. | 423/338 |
| 4,127,641 | 11/1978 | Aldcroft et al. | 423/339 |
| 4,640,807 | 2/1987 | Afgan et al. | 423/338 |
| 4,683,128 | 7/1987 | Orii et al. | 423/338 |
| 5,028,360 | 7/1991 | Ito et al. | 264/12 |

FOREIGN PATENT DOCUMENTS

| | | |
|---|---|---|
| 1667078 | 5/1971 | Germany . |
| 47-35676 | 9/1972 | Japan . |
| 53-65295 | 6/1978 | Japan . |
| 54-9588 | 5/1979 | Japan . |
| 2113713 | 5/1987 | Japan ........................ 423/338 |
| 62-275014 | 11/1987 | Japan . |
| 1094798 | 12/1967 | United Kingdom . |

OTHER PUBLICATIONS

Patent Abstracts of Japan vol. 12, No. 165 (C–496) (3012), 18 May 1988 & JP-A-62275014 (Toyo Soda Mfg Co. Ltd.) 30. Nov. 1987.

Patent Abstracts of Japan vol. 11, No. 371 (C–462) (2818), 3 Dec. 1987; & JP-A-62143817 (Toyo Soda Mfg Co. Ltd) 27. Jun. 1987.

Patent Abstracts of Japan vol. 2, No. 100 (C–78), 18 Aug. 1978; & JP-A-5365293 (Central Glass K.K.) 06. Oct. 1978.

Satish Wason, "Silica Gels", Pigment Handbook & vol. 1: Properties and Economics Second Edition, John Wiley & Sons, 1988, pp. 175–179.

*Primary Examiner*—John Niebling
*Attorney, Agent, or Firm*—Tarolli, Sundheim, Covell, Tummino & Szabo

[57] ABSTRACT

In the present invention, minute spherular silica gel particles suitable as polymer catalyst carriers can easily be obtained without using organic substances simply by controlling the moisture content in a slurry of silica hydrogel particles and water. The obtained spherular silica gel particles have physical properties, such as specific surface area, average pore diameter, and pore volume, that may be easily controlled. The spherular silica gel particles also have sufficient particle strength.

24 Claims, No Drawings

METHOD FOR PREPARING SPHERULAR SILICA GEL PARTICLES

This is a continuation of application Ser. No. 07/556,898, filed on Jul. 23, 1990, now abandoned.

BACKGROUND OF THE INVENTION

This invention relates to a method for preparing spherular silica gel particles, especially to a method for preparing spherular silica gel particles suitable as a carrier of a catalyst for initiating the polymerizing of olefin.

Spherular silica gel particles have been widely used as carriers for a catalyst used to initiate the polymerization of olefin. Since the spherular silica gel particles are inactive porous particles, they are desirable carriers of the polymerization-initiating catalyst. Furthermore, spherular silica gel particles have desirable fluidity for vapor-phase polymerization.

The physical properties, such as surface area, average pore diameter, pore volume, particle strength, and average pore diameter, of the spherular silica gel particles used as carriers should be strictly controlled. These physical properties of the spherular silica gel particles should be generally kept within the following ranges:

surface area—50 to 700m$^2$/g;

average pore diameter—20 to 1000 Å;

pore volume—0.3 to 2.0 ml/g;

average particle diameter—5 μm to 5 mm; and particle strength—1 to 4.

However, spherular silica gel particles with physical properties satisfying the above ranges have been difficult and expensive to prepare.

One known method for preparing spherular silica gel particles is disclosed in Japan Published Examined Patent Application No. S54-9588. By the method disclosed therein, colloidal silica is formed into spherular particles with an average particle diameter of 0.5 μm to 50 μm using hydrophilic organic substances as a binding agent. However, this method requires an intricate step where the mixture of prepared silica sol particles and the organic substances are sintered at 500° C. minimum for four hours or longer to remove polymerized organic substances. This method has another problem caused by the fact that the physical properties of the spherular silica gel product are hard to control because the physical properties of the original colloidal silica determine those of the silica gel product.

On the other hand, a method for preparing spherular silica gel particles without using organic substances is proposed in Japan Published Unexamined Patent Application No. S53-65295 In the method described therein, silica sol is spray-dried to obtain spherular silica gel particles. However, irregular silica gel particles such as hollow or indented gel particles result from this method. These silica gel particles have less fluidity and have varying particle strength.

Another known method is proposed in Japan Published Examined Patent Application No. S47-35676. The method described therein comprises the steps of mixing sodium silicate and sulfuric acid at 23° C. to 50° C., preparing a mixture solution of a ph 9.8 to a ph 10.4 to form silica hydrogel slurry, aging the silica hydrogel slurry, decreasing the pH to 3 or below, increasing the pH between 8 and 10.2, aging, and spray-drying. However, since this method requires many intricate steps, it is an industrially disadvantageous method. Further, the particle strength of the resulting silica gel particles is hard to control.

Another known method is proposed in Japan Published Unexamined Patent Application No. S62-275014. The method described therein comprises the steps of reacting sodium silicate solution and mineral acid to prepare silica hydrogel slurry, mixing aqueous ammonia with the silica hydrogel slurry, wet-grinding and spray-drying. However, by this method, the particle strength of the silica gel product is hard to control.

SUMMARY OF THE INVENTION

One object of this invention is to provide a method for preparing spherular silica gel particles, without using organic substances, while controlling surface area, average pore diameter, pore volume, average particle diameter, and particle strength of the spherular silica gel particles.

Through research it has been discovered that when the silica hydrogel slurry resulting from the reaction of alkali metal silicate and mineral acid is ground and spray-dried, the concentration of the components of the silica hydrogel slurry determines the particle strength of the spherular silica gel products.

As a result, to attain the above object, the present invention provides a method for preparing spherular silica gel particles comprising the steps of reacting alkali metal silicate and mineral acid to prepare silica hydrogel particles, wet-grinding the silica hydrogel particles, and spray-drying the slurry of the silica hydrogel particles and water to produce spherular silica gel particles. In the method the weight of moisture in the slurry is adjusted to between 0.2 and 1.5 times the weight of the silica hydrogel particles in the slurry.

First, in this invention an aqueous solution of alkali metal silicate and an aqueous solution of mineral acid are reacted to prepare silica hydrosol. For alkali metal silicate, sodium silicate and potassium silicate are available. Sodium silicate is best. For mineral acid, sulfuric acid, hydrochloric acid, and nitric acid are available. Alkali metal silicate and mineral acid can be reacted by batch process or continuous process. The reaction conditions are not limited, but the concentration of $SiO_2$ in the silica hydrosol resulting from this reaction should range from 10% to 22% by weight. When the concentration of $SiO_2$ in the silica hydrosol falls below this range, it takes a longer time to congeal the silica hydrosol. Such a low concentration is thus industrially disadvantageous. When the concentration exceeds this range, the silica hydrosol is congealed so quickly that uniform silica hydrogel particles cannot be produced. To adjust the concentration of $SiO_2$ in the silica hydrosol, the concentration and the usage of the alkali metal silicate and the mineral acid can be varied. Usually, an alkali metal silicate solution contains from 15% to 27% by weight of $SiO_2$, and the concentration of the mineral acid solution is between 3N and 18N.

The silica hydrosol congeals into silica hydrogel particles. Subsequently, the silica hydrogel particles are separated from the mixture and rinsed.

In this invention, hydrothermal treatment prior to wet-grinding of silica hydrogel particles is desirable. During the hydrothermal treatment, the silica hydrogel particles are suspended in demineralized water, aqueous ammonia is added to adjust the aqueous suspension to between a pH of 1 and a pH of 10, and the aqueous suspension is stored for one to fifty hours at 50° C. to 200° C. The pH should be in the range between one and ten, because a pH outside this range increases the solubility of silica.

The silica hydrogel particles are separated from the hydrothermally treated mixture. The separated silica hydrogel particles are coarsely ground using a machine, such as an impact mill, a jet mill, a ball mill, a stone mill or the like, until the particle diameter of 100 μm to 200 μm is obtained. During the grinding, moisture is removed from the surface of the silica hydrogel particles.

In this invention, after the silica hydrogel particles together with water are formed into slurry, the slurry is wet-ground. The wet-ground slurry is spray-dried to obtain spherular silica gel particles. The weight of water used to form the slurry is 0.2 to 1.5 times, preferably 0.3 to 1.4 times, that of the silica hydrogel particles in the slurry. When too little water is used, the slurry cannot be formed, spherular silica gel particles cannot be obtained by spray-drying, or sufficient particle strength of the silica gel particles cannot be obtained. When the slurry contains too much moisture, the particle strength of the silica gel particles is insufficient. For silica hydrogel particles with specific surface areas equaling or exceeding 400 m²/g, when the concentration of the slurry is adjusted such that sufficient particle strength is obtained, the slurry becomes too viscous to mix and wet-grind. To facilitate the mixing and wet-grinding, the slurry should be adjusted to between a pH of 1 to 3.

The wet-grinding influences the surface condition and configuration of the end product of the silica gel particles. During the wet-grinding, a mill such as a ball mill, a vibrating mill, a mixing ball mill, a rod mill, a disc attrition mill, or a stone colloid mill, is used. The wet-grinding should be repeated until the particle size of the silica hydrogel particles in the slurry becomes 1 μm to 50 μm, preferably 10 μm to 30 μm.

In this invention, by spray-drying the slurry of silica hydrogel particles containing a specific ratio of moisture, spherular silica gel particles are obtained. For a spray-drying method, a pressure nozzle method, a rotating disc method, and a binary fluid nozzle method are available. The sprayed slurry is dried by hot air of 100° C. to 500° C. Through the spray-drying, the silica gel particles can have desired particle diameters about between 1 μm to 200 μm. The silica gel particles as carriers of a catalyst for initiating polymerizing olefin should have particle diameters of 30 μm to 100 μm.

DETAILED DESCRIPTION OF THE PREFERRED EMBODIMENTS

Embodiments 1–3

By mixing and reacting a sodium silicate solution and a sulfuric acid solution, silica hydrosol with the $SiO_2$ concentration of 18.5% by weight was generated. The silica hydrosol was stored for one hour and congealed to form silica hydrogel particles.

Subsequently, the silica hydrogel particles were filtered, rinsed and mixed with demineralized water. To the mixture of silica hydrogel particles and demineralized water, 28%-by-weight aqueous ammonia was added to prepare a slurry of silica hydrogel particles in water and to adjust the pH of the slurry to 8.5. Then, the temperature of the slurry was raised to 95° C., and at 95° C. the slurry was hydrothermally treated for thirty-eight hours.

Subsequently, the silica hydrogel particles were again filtered from the slurry, and were coarsely ground using an impact type mill (e.g. an M-4A type free crushing mill manufactured by Nara Kikai Seisaku-sho). The ground gel particles were mixed with demineralized water to prepare a slurry of a predetermined percentage by weight as shown in Table 1. The silica hydrogel particles in the prepared slurry were wet-ground using a stone type mill (e.g. Super Mass Colloider, manufactured by Masukou Sangyo Ltd.).

After wet-grinding, micro spherular silica gel particles were collected by spray-drying the slurry using a disc-type spray drier (e.g. CS-100, manufactured by Ohkawara Kakouki Ltd.), in which the peripheral speed of the disc was approximately 45m/sec. and the temperature of hot air was 370° C. at the inlet of the drier and 150° C. at the outlet of the drier.

The average particle diameter, surface area, and particle strength of the collected spherular silica gel particles were measured as shown in Table 1.

To obtain comparison data, when the moisture ratio of the slurry was reduced to less than 0.2 times by weight, the slurry could not be formed. On the other hand, when the rate was increased to over 1.5 times by weight, the particles were cracked during the preparation for the measurement.

TABLE 1

|  | EMBODIMENT 1 | EMBODIMENT 2 | EMBODIMENT 3 |
| --- | --- | --- | --- |
| Moisture ratio in the slurry (by weight)* | 0.75 | 1.05 | 1.33 |
| Average particle diameter (μm) | 69.7 | 61.2 | 55.6 |
| Particle strength** | 1.36 | 2.09 | 8.02 |
| Surface area (m²/g) | 275 | 284 | 294 |

Notes:
*The moisture ratio in the slurry (by weight) means the of the weight of moisture to the weight of silica hydrogel particles in the slurry.
**The particle strength:

Sample silica gel particles were filtered using a 100-mesh screen to remove coagulum and dried at 180° C. for two hours. Four grams of the sample were converted to slurry using 100 g of aqueous solution containing 40% by weight of glycerin. The slurry was treated for two hours using an ultrasonic cleaner (e.g. at 150 w, 26 kHz and power control 10) to grind particles. The grain size distribution after ultrasonic treatment was obtained and compared with that prior to the treatment. The particle strength is obtained using the following formula. The closer to one the value of the particle strength is, the greater the particle strength is.

Particle strength=[D(90)/D(10) after treatment]/[D(90)/D(10) before treatment]

An ultrasonic cleaner of VO150FS-S type manufactured by Sinmei Kogyo Ltd. and a grain-size measuring apparatus of type CAPA-700 manufactured by Horiba Ltd. were used for the embodiments. The method for measuring the grain-size distribution used the phenomenon of particles' precipitation.

Embodiments 4–6

These embodiments use almost the same method as that used for the embodiments 1–3. The embodiments 4–6 are different from the embodiments 1–3 in that the slurry is hydrothermally treated at a pH of 6–7 and 72° C. for seven hours, the pH of the slurry prior to spray-drying is 2.0, and the moisture ratio in the slurry is as shown in Table 2. The physical properties of the collected spherular silica gel particles are also shown in Table 2.

TABLE 2

|  | EMBODIMENT 4 | EMBODIMENT 5 | EMBODIMENT 6 |
| --- | --- | --- | --- |
| Moisture ratio in the slurry (by weight) | 0.35 | 0.40 | 0.45 |
| Average particle diameter (μm) | 77.9 | 71.0 | 67.4 |
| Particle strength | 2.55 | 2.79 | 2.92 |
| Surface area (m²/g) | 613 | 617 | 589 |

Embodiments 7–9

These embodiments follow method of embodiments 4–6 for preparing silica hydrogel particles and spherular silica gel particles. The physical properties of the collected spherular silica gel particles are shown in Table 3.

TABLE 3

|  | EMBODIMENT 7 | EMBODIMENT 8 | EMBODIMENT 9 |
| --- | --- | --- | --- |
| Moisture ratio in the slurry (by weight) | 0.35 | 0.35 | 0.35 |
| Average particle diameter (μm) | 62.9 | 69.4 | 77.9 |
| Particle strength | 3.01 | 3.43 | 2.55 |
| Surface area (m²/g) | 405 | 531 | 613 |

Preferred embodiments of the present invention are above described in detail. The present invention is not limited to the embodiments above. Obviously, many modifications of the present invention are possible in the light of the above teachings.

What is claimed is:

1. A method for preparing spherular silica gel particles comprising the steps of:

preparing a silica hydrosol from alkali metal silicate and mineral acid;

allowing the silica hydrosol to form a silica hydrogel;

preparing a slurry containing the silica hydrogel;

controlling the moisture in the slurry to 0.2 to 1.5 times the weight of the silica hydrogel particles in the slurry by adding water wherein the concentration of the components of the slurry determines the strength of the silica gel particles;

adjusting the pH of the slurry to a pH of 1 to 3:

wet-grinding the silica hydrogel particles at said slurry moisture content and pH; and spray-drying the wet-ground silica hydrogel particles to produce silica gel particles;

said silica gel particles having a particle strength in the range of 1 to 4.

2. The method of claim 1, in which the alkali metal silicate is chosen from the group consisting of sodium silicate and potassium silicate.

3. The method of claim 1, in which the alkali metal silicate is sodium silicate.

4. The method of claim 1, in which the mineral acid is chosen from the group consisting of sulfuric acid, hydrochloric acid, and nitric acid.

5. The method of claim 1, in which the alkali metal silicate and mineral acid are contained in aqueous solutions.

6. The method of claim 1, in which the slurry contains from 10% to 22% by weight of $SiO_2$.

7. The method of claim 6, in which the alkali metal silicate solution contains from 15% to 27% by weight of $SiO_2$ and the concentration of the mineral acid solution is from 3N to 18N.

8. The method of claim 1, in which the silica hydrogel particles are wet-ground until the silica hydrogel particles have a diameter of from 1 μm to 50 μm.

9. The method of claim 1, in which the weight of the moisture in the slurry is from 0.3 to 1.4 times the weight of the silica hydrogel particles in the slurry.

10. The method of claim 1, in which the slurry is wet-ground by using a grinder chosen from the group consisting of a ball mill, a vibrating mill, a mixing ball mill, a rod mill, a disc attrition mill, and a stone colloid mill.

11. The method of claim 1, in which the wet-ground slurry is spray-dried using a method chosen from the group consisting of the pressure nozzle method, the rotating disc method, and the binary fluid nozzle method.

12. The method of claim 1 further comprising the step of drying the wet-ground, spray-dried slurry with air having a temperature from 100° C. to 500° C.

13. The method of claim 1 further comprising the steps of:

separating the silica hydrogel particles from the slurry formed from the silica hydrosol; and rinsing the silica hydrogel particles with water and forming a second slurry with the silica hydrogel particles before the step of wet-grinding the silica hydrogel particles.

14. The method of claim 1 further comprising the step of hydrothermally treating the silica hydrogel particles before the step of wet-grinding the silica hydrogel particles.

15. The method of claim 14, in which the step of hydrothermally treating the silica hydrogel particles comprises the steps of:

suspending the silica hydrogel particles in demineralized water;

adjusting the pH of the aqueous suspension to a pH of 1 to 10 by adding aqueous ammonia; and storing the pH-adjusted aqueous suspension for from one to fifty hours at from 50° to 200° C.

16. The method of claim 1, further comprising the step of coarse-grinding the silica hydrogel particles to a diameter of from 100 μm to 200 μm before the step of wet-grinding the silica hydrogel particles.

17. A method for preparing spherular silica gel particles comprising the steps of:

preparing a mixture containing a hydrosol by mixing an aqueous solution of alkali metal silicate with an aqueous solution of mineral acid;

allowing the silica hydrosol to form a silica hydrogel;

separating the silica hydrogel from the mixture;

rinsing the silica hydrogel with water;

suspending the silica hydrogel in demineralized water to make a first slurry;

adding an aqueous ammonia to the first slurry so as to adjust the pH of the first slurry to a pH of 1 to 10;

allowing the silica hydrosol to form a silica hydrogel having a surface area of 400 m²/gram or more;

preparing a slurry containing the silica hydrogel;

controlling the moisture in the slurry to 0.2 to 1.5 times the weight of the silica hydrogel particles in the slurry by adding water wherein the concentration of the components of the slurry determines the strength of the silica gel particles;

adjusting the pH of the slurry to a pH of 1 to 3;

wet-grinding the silica hydrogel particles at said slurry moisture content and pH until the silica hydrogel particles have a diameter of from 1 μm to 50 μm; and spray-drying the wet-ground silica hydrogel particles to produce silica gel particles;

said silica gel particles having a particle strength in the range of 1 to 4.

18. The method of claim 17, in which the alkali metal silicate is sodium silicate.

19. The method of claim 18, in which the alkali metal silicate solution contains from 15% to 27% by weight of $SiO_2$ and the concentration of the mineral acid solution is from 3N to 18N.

20. A method for preparing spherular silica gel particles suitable as carriers for a catalyst comprising the steps of:

preparing a silica hydrosol from alkali metal silicate and mineral acid;

allowing the silica hydrosol to form a silica hydrogel;

preparing a slurry containing the silica hydrogel;

controlling the moisture in the slurry to 0.2 to 1.5 times the weight of the silica hydrogel particles in the slurry by adding water;

adjusting the pH of the slurry to a pH of 1 to 3;

wet-grinding the silica hydrogel particles at said slurry moisture content and pH until the silica hydrogel particles have a diameter of from 1 μm to 50 μm; and spray-drying the wet-ground silica hydrogel particles to produce silica gel particles;

said silica gel particles having a particle strength in the range of 1 to 4.

21. The method of claim 20 wherein said spray-dried particles have a particle diameter between about 1 μm to 200 μm.

22. Spherular spray dried silica gel particles suitable as carriers for a catalyst prepared by the method of claim 20.

23. The method of claim 20 wherein said spray-dried particles have a surface area in the range of 50 to 700 $m^2$/gram.

24. A method for preparing spherular silica gel particles comprising the steps of:

preparing a silica hydrosol from alkali metal silicate and mineral acid;

allowing the silica hydrosol to form a silica hydrogel having a surface area of 400 $m^2$/gram or more;

preparing a slurry containing the silica hydrogel;

controlling the moisture in the slurry to 0.2 to 1.5 times the weight of the silica hydrogel particles in the slurry by adding water wherein the concentration of the components of the slurry determines the strength of the silica gel particles;

adjusting the pH of the slurry to a pH of 1 to 3;

wet-grinding the silica hydrogel particles at said slurry moisture content and pH; and spray-drying the wet-ground silica hydrogel particles to produce silica gel particles;

said silica gel particles having a particle strength in the range of 1 to 4.

* * * * *